Dec. 18, 1923.
E. B. NOWOSIELSKI
MAGNETO ELECTRIC GENERATOR
Filed March 12 1920   4 Sheets-Sheet 3
1,477,843
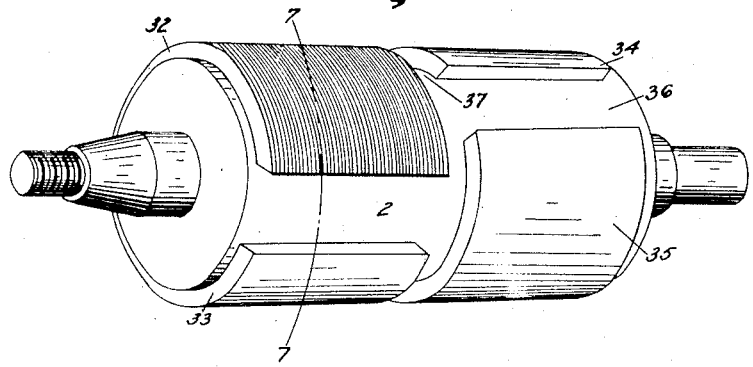
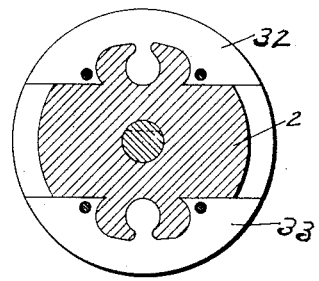
INVENTOR
Edward B. Nowosielski
BY
Albion D. T. Libby
ATTORNEY Dec. 18, 1923. 1,477,843
E. B. NOWOSIELSKI
MAGNETO ELECTRIC GENERATOR
Filed March 12, 1920 4 Sheets-Sheet 4
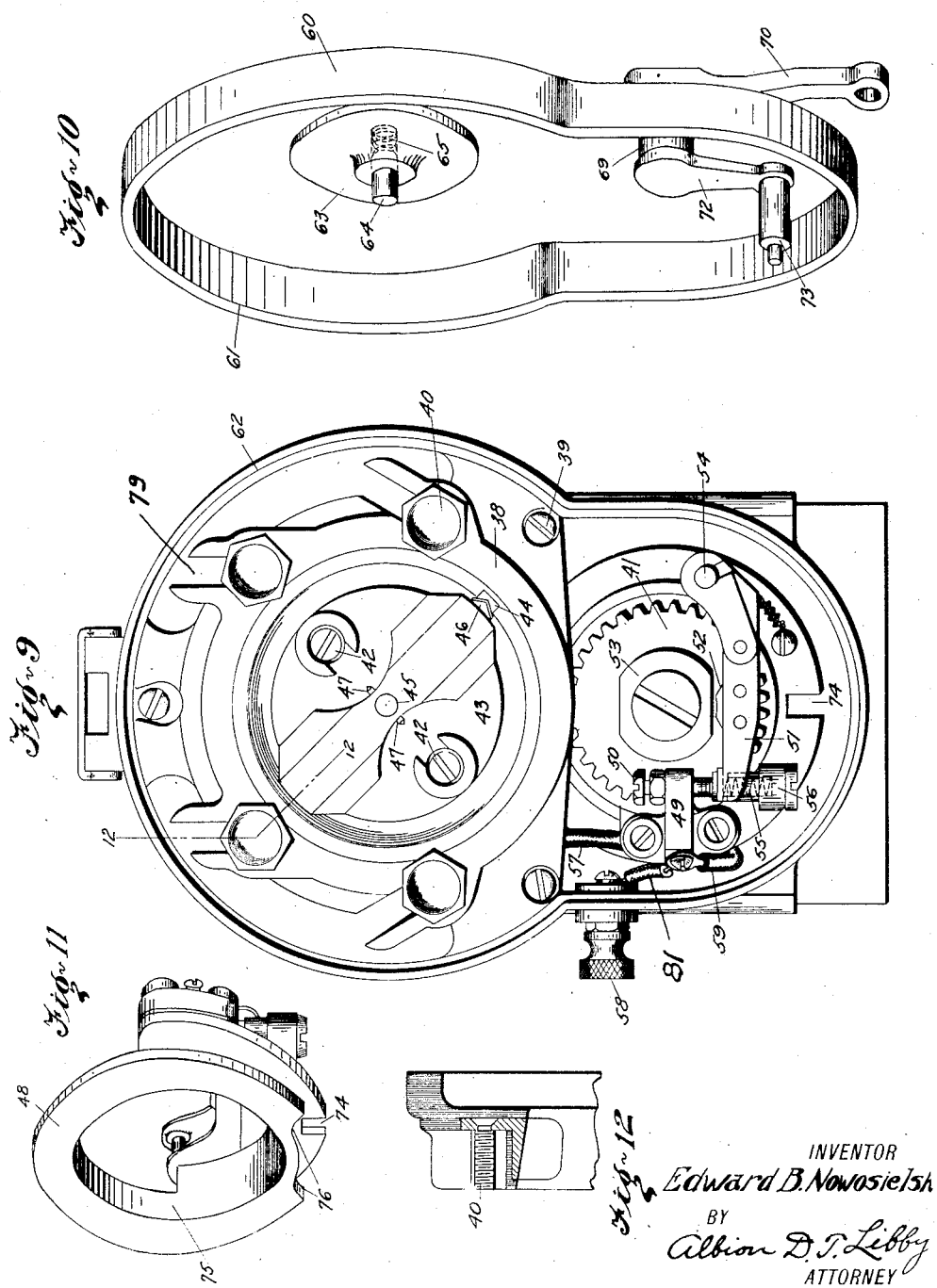
INVENTOR
Edward B. Nowosielski
BY
Albion D. T. Libby
ATTORNEY Patented Dec. 18, 1923.

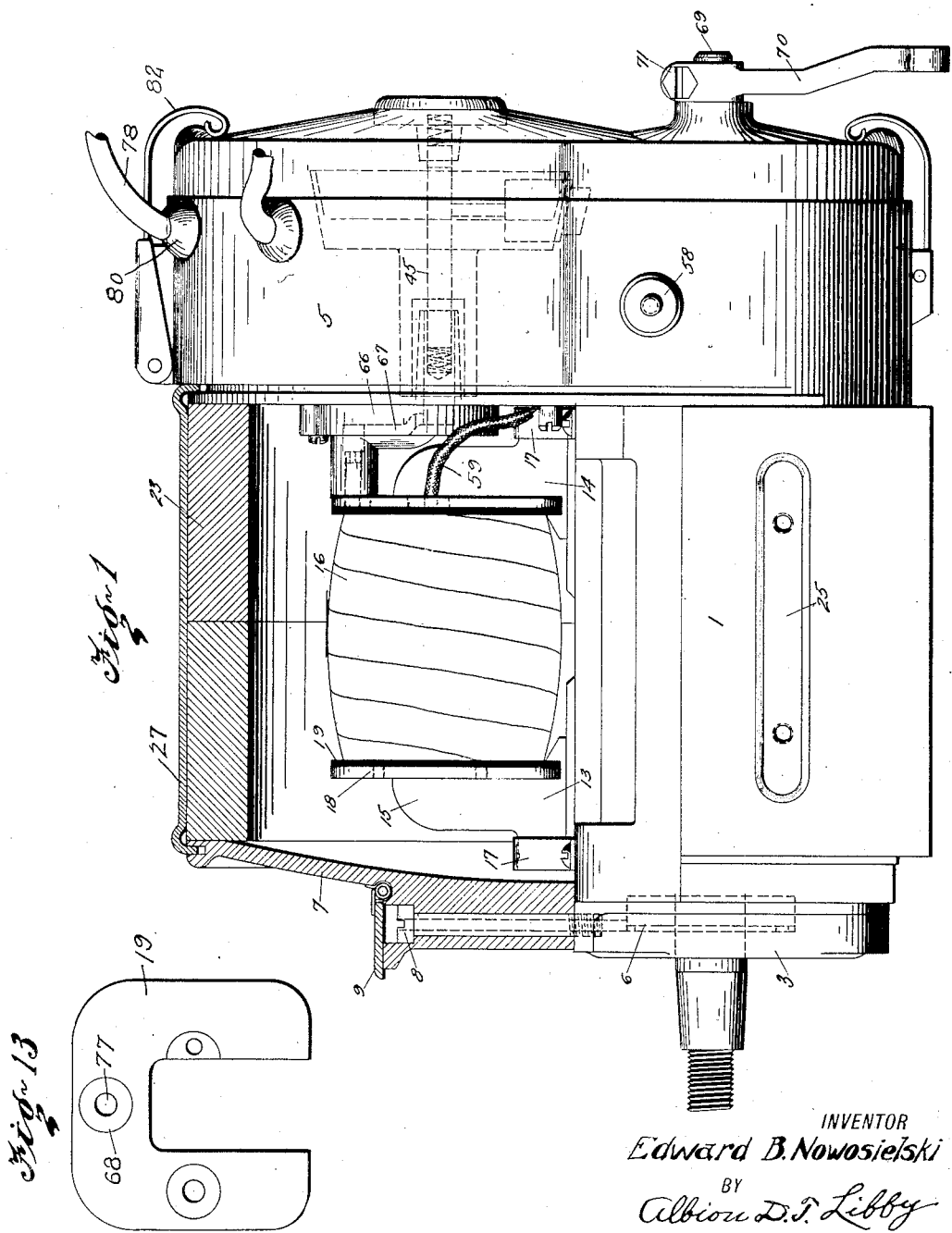

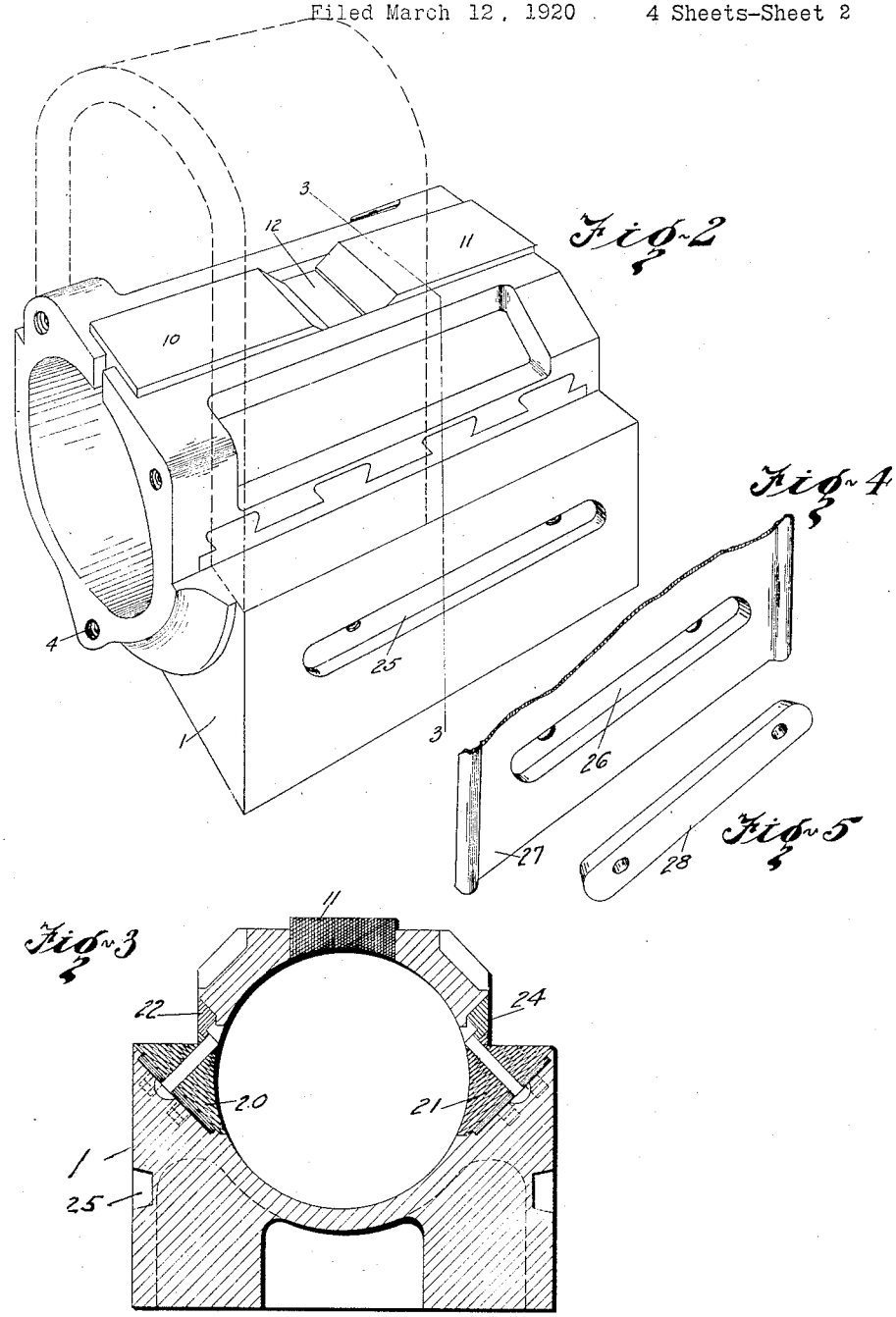

1,477,843

UNITED STATES PATENT OFFICE.

EDWARD B. NOWOSIELSKI, OF BLOOMFIELD, NEW JERSEY, ASSIGNOR TO SPLITDORF ELECTRICAL COMPANY, OF NEWARK, NEW JERSEY.

MAGNETO-ELECTRIC GENERATOR.

Application filed March 12, 1920. Serial No. 365,305.

To all whom it may concern:

Be it known that I, EDWARD B. NOWOSIELSKI, a citizen of the United States, residing at No. 1 Clearfield Avenue, Bloomfield, in the county of Essex, State of New Jersey, have invented certain new and useful Improvements in Magneto-Electric Generators, of which the following is a description, reference being had to the accompanying drawing and to the figures of reference marked thereon.

My invention relates to electric generators, more particularly of the magneto type as are customarily used for ignition purposes in connection with internal combustion engines.

It is the principal object of my invention to provide an electric generator of the ignition type which will be highly efficient in its operation, relatively simple in its construction and hence easy to manufacture. In magnetos having armatures of the Siemens type, the armatures are hard to wind on account of the great precaution that must be taken to insulate the high tension winding from the iron around which the winding is placed; armatures of this type are also subject to rotational forces and are therefore more apt to give trouble than stationary windings. Such armatures are also subject to accumulations of water, dirt, dust, etc., and break down more frequently than do stationary windings that are given a reasonable amount of care in assembling.

In the electrical generator to be described and claimed herein, the generating coil is stationary and is placed within the arch of the magnets and is completely enclosed by the magnets and end plates and therefore is fully protected from all injurious agents.

I do not claim broadly to be the first to mount the generating coil within the arch of the magnets as this construction is fully set forth in the Dixie type magnetos as illustrated by Mason Patent 1,226,233, issued May 15, 1917. It will be noted, however, that in the Dixie type of magneto above referred to, the axis of the generating coil is at right angles to the axis of the rotating member; also the magnets are arranged in planes parallel with the axis of the rotating member, while in my construction the axis of the generating coil is parallel with the axis of the rotating member and magnets are arranged at right angles to the arrangement of the Dixie type magnetos or they are placed on the magnetos similarly as in the ordinary Siemens armature type of machine. My arrangement of the generating coil is very advantageous for there is more room lengthwise of the machine than crosswise as in the Dixie type, and I can build my coils larger and get a greater output. This is a particularly valuable feature in building a two spark machine, that is, one which delivers two high tension sparks simultaneously from the same coil.

In the application Serial No. 336,174 filed November 6, 1919, by J. K. Leibing there is shown and described ways and means for arranging the magnets and co-operating pole pieces in such a way as to materially increase the efficiency of the electrical generator. I have utilized this highly important feature in the generator described in this application and by combining it with my special construction and arrangement of the generating coil and core and co-operating pole pieces, distributing circuit breaker, etc., I have produced an ignition generator in which the efficiency is exceedingly high, much more than in other types of magnetos of which I am aware.

In the relatively stationary coil ignition generators, that is to say, one in which the coil does not rotate but which may be adjustable for timing purposes certain objections have been found in the constructional feature by which the coil structure is moved by the timing lever and in order to remove this constructional difficulty a fixed coil or a fixed spark machine has been used for many purposes, the advance being taken care of by setting the ignition a fixed number of degrees in advance of the engine pistons.

The design discussed herein contemplates a magneto having a fixed coil with an adjustable breaker box for timing purposes. The generator is so efficient that even with the breaker box in retarded position whereby the inductors of the rotary members are some distance from the magnetic pole pieces, a hot spark is produced at speeds lower than an engine can operate; this then is another feature of my invention.

Another object of my invention is to provide attachment means to the breaker box which can be quickly adjusted for any position of the engine operating levers, that is to say, the advance lever on the breaker box is of universal type.

Another object of my invention is to provide a distributer block and associated mechanism and a circuit breaker all completely enclosed within a simple housing or chamber so that these parts are protected from dirt, water and other harmful agencies and may be readily gotten at by the removal of a single cover plate.

Other and further objects will be apparent to one skilled in the art after a study of the annexed drawings taken in connection with the specifications.

In the drawings Figure 1 is a side view of my electric generator with the magnets broken away to show the generating coil in working position.

Figure 2 is a perspective view of the rotor housing, showing in dotted lines one of the magnets in position.

Figure 3 is a sectional view on the lines 3—3 of Figure 2.

Figure 4 is a detail of the cover for covering the magnets and holding them in position on the rotor housing.

Figure 5 shows a clamp used with the cover of Figure 4 for holding the same in position on the generator.

Figure 6 is a view of the rotating member.

Figure 7 is a view on the lines 7—7 of Figure 6 between two of the inductor laminations.

Figure 8 is a view of the driving shaft of the rotable member.

Figure 9 is a right hand end view of Figure 1 but with the covered plate removed.

Figure 10 is a view of the cover plate removed from the end plate shown in Figure 9.

Figure 11 is a perspective view of the breaker box.

Figure 12 is a section on the line 12—12 of Figure 9.

Figure 13 is a plan view of the coil heads showing holes for the conductors leading from the coil.

Referring now to the details wherein like numbers refer to corresponding parts in the various views, 1 is a base or housing structure within which the rotor 2 is positioned, being supported on bearings at either end, one of said bearings 6 being shown carried by the end plate 3, that is adapted to be fastened to the housing in any suitable manner such as by screws engaging holes 4. The other end plate is indicated at 5. Supported on the end plate 3 and preferably overlapping housing 1 is a supplemental plate 7, the upper end of which rests against the magnets 23 and is also engaged by the cover plate 27 as will be clearly seen in Figure 1. The supplemental plate 7 is fastened to the end plate 3 by a screw 8 which is hollow and serves as an oil duct leading from the chamber above the head of the screw down adjacent to the bearing 6. A lid 9 fastened to plate 7 covers the oil chamber leading to the screw 8. Carried on the top part of the housing 1 are two coil pole-pieces 10 and 11 which are arranged longitudinally but spaced apart as indicated by 12. These pole-pieces are flat on top and of relatively large area to provide contact surfaces for the enlarged polar areas 13 and 14 of the core 15 which is U shaped and carries the generating coil 16 which preferably consists of a high and low tension winding such as is ordinarily used in a high tension generator. The polar projections 13 and 14 are held in position on the poles 10 and 11 in any suitable manner such as by clamps 17. By means of this construction the air gap between the pole pieces and the inductor elements remains undisturbed, while the coil with its pole piece may be removed and easily replaced in position, leaving the magnetic circuit as it was before between the rotating elements and the coil pole pieces. The heads of the generator coil 16 are preferably made U shape so that the arms extend down around the polar areas 13 and 14 as indicated in Figure 1, in order to keep the laminations, of which core 15 is made, from spreading. These heads are preferably composite in character, having one part 18 of magnetic metal which serves to prevent flux leakage and direct the flux from the pole-pieces 10 and 11 and polar areas 13 and 14 through the core 15 embraced by the coil 16, while an insulating member 19 is placed between 18 and the winding.

I prefer to mould the insulating part 19 to the magnetic part 18 so that during the moulding process a portion of the moulded material is extruded through apertures formed in the magnetic portion, the holes in the magnetic portion being of such a character that heads 68 are formed on the extruded portion of the insulating material, thereby in effect forming rivets to bind the parts 18 and 19 together and these extruded portions are furthermore provided with holes 77 for the passage of conductors leading from the winding.

The base 1 carries on opposite sides thereof magnet pole-pieces 20 and 21 which are preferably arranged so that the center of their inner arcuate faces is about on a line with a horizontal plane and passing through the center of rotation of the rotor, and as will be seen from Figure 3 these pole pieces 20 and 21 are a considerable distance from the bottom of the base 1 so that magnetic leakage from these pole-pieces to any magnetic metal on which the machine may be placed, is substantially eliminated. The pole-pieces 20 and 21 are shouldered as indicated at 22 and 24 to receive magnets 23 which from the structure indicated make contact on their ends with the pole pieces 20 and 21 as well as on the inner parts of the legs of the magnets, the advantages of which construction I have hereinbefore referred to and which are described in the said Leibing application. The pole pieces 20 and 21 extend substantially the full length of the base of the housing 1 as will be seen from Figure 2, which preferably engage the laminations in pole-pieces 10 and 11 and 20 and 21 in such a manner that magnetic flux will not have to cross the gap between laminations, but will travel in the individual laminations themselves.

The base 1 has recess 25 on either side to receive projection 26 that is punched inwardly on the cover plate 27 used to cover the magnet 23. The plate 27 is held in position by a clamping member 28 which fits within the recess by punching out the projection 26 so that when the cover plate is in an assembled position there are no screws projecting therefrom but a smooth finished surface is presented.

The rotor 2 has a shaft 29 reduced in diameter at 30 for a portion of its length in order to increase the distance between the shaft and the inductors carried thereby. A part of this shaft is flattened off at 31 for the purpose of gripping the metal 36 preferably cast around the shaft. As shown in Figure 6 the rotor carries around its periphery two sets of inductors, one set being indicated by 32 and 33 and the other set by 34 and 35. The two sets are spaced apart from each other as indicated at 37 and are angularly displaced one set to the other by an angle of 90°. The laminations are preferably moulded on to the shaft by means of a non-magnetic metal 36, being locked thereon in any suitable manner such as the construction as shown in Figure 7 which is a view on the line 7—7 of Figure 6 taken between two laminations. It will be understood, of course, that the shaft 29 may be made altogether of non-magnetic metal such as bronze of suitable composition, but the construction shown is particularly adapted for the use of steel. In the arrangement of the pole pieces 20 and 21 so that they are cut by a horizontal plane passing through the rotor shaft near the center of their arcuate faces, and the arrangement of the arcuate length of the inductors on the rotor shaft being just sufficient to extend from one magnet pole piece to the other with substantially no overlap, enables rapid flux changes of the coil 16 to take place. It is well known that the amount of overlap, that is to say, the amount by which the armature pole tips or inductors bridge the magneto pole pieces, serves to alter the wave form of the electric generator and thereby the maximum peak value. A higher peak value usually being obtained when the overlap is substantially nil. When the overlap is considerable, a certain portion of the flux is shunted out of the coil core before the reversal due to the inductors being rotated to a position whereby they are excited by poles of opposite polarity. In the case of no overlap, as the inductors pass from the pole of one polarity to the other, the reversal takes place at once and the magnetic flux in the coil core instead of dying out gradually is "forced" out by the reverse direction of flux; hence the rate of change of flux through the coil core is a maximum under this condition, producing a higher peak voltage. In the construction herein shown and described where the overlap is substantially nil for one set of inductors, the flux is barely started on its shunted path before the reverse flux is brought into action and a relatively high voltage wave is obtained. One function of a large overlap is to prevent the magnetic circuit of the magnets being open, but this danger is obviated in my construction by the fact that when one set of inductors is in the position of extending from the pole piece 20 to 21 under the coil pole piece 10 the set of inductors 34 and 35 on the rear end of the rotor form a bridge through the medium of the coil pole piece 11 so that the magnetic circuit is never entirely broken.

The end plate 5 is constructed with a chamber, within the upper part of which a distributer block 38 is mounted, being held within the said chamber in any suitable manner as by screws 39. The distributer block shown is suitable for a four cylinder engine, the connections being made to the terminal posts of the block by contacts 40. The conductors 78 come out of the distributer block by way of grooves 79 and bushings 80 which are preferably of soft rubber set in plate 5. Carried in a suitable bearing (not shown) on the plate 5 is the usual distributer gear that is operated by driving pinion 41 carried on the shaft of the rotor. Associated with the distributer gear and the distributer block is a distributer finger 43, the same being held to the gear by screws 42 which also serve as one terminal of a safety gap, the other terminal of which is indicated at 47 and connection being made between the points 47 and electrode 45 having contacts with an electrical conductor 67 carried by terminal block 66 mounted on the back of the plate 5. It is understood that the conductor 67 connects with a high tension winding of the coil 16 in any suitable manner. The distributer finger 43 carries a distributer brush 44 and distributes the current to the various contacts 40 all in a well known manner. The holder for the brush 44 has a projection 46 used for assisting in timing the generator with the engine.

Mounted in the lower part of the chamber of plate 5 is the breaker box mechanism generally indicated by the numeral 48. An adjustable contact 50 is carried on the block 49 supported on the box 48 but insulated therefrom. The movable breaker arm 51, carrying the bumper 52 adapted to be engaged by the cam 53 carried on the end of the shaft 29, is pivoted to the member 48 in any suitable manner as by pivot pin 54. Breaker box 48 carries a spring 55 in the chamber 56. Spring 55 engages the breaker arm 51 at its extreme end and in line with the contact 50, the full advantages of which are set forth in my co-pending patent application, Serial No. 293,433, filed April 29, 1919, but it may be mentioned here that I have found such an arrangement of controlling the spring for the movable breaker arm will allow the same to respond to high rotative speeds of the operating cam. It will be noted that while I have shown a two-lobe cam, the rotor shown in Figure 6 is capable of producing four current impulses on the coil 16 for each revolution, but the number of impulses is controlled by the type of cam used. Since the distributer indicated is for a four cylinder engine only two sparks per revolution are required, and hence a two lobe cam is used. Conductor 57 is shown leading from the terminal 49 and this goes to a condenser carried within the chamber of plate 5, but since it is behind the distributer block 38 it is not shown. Another conductor 59 leads from the terminal block 49 to the coil 16, and another conductor 81 leads to a terminal post 58 that is wired to a control switch on the dash. The chamber of the end plate 5 is closed by a cover 60 having a rim 61 adapted to engage the flange 62. The plate 60 carries an insulator 63 having a thrust member 64 adapted to engage the end of the conductor 45 to hold the distributer finger 43 in correct position. Spring 65 is used to give proper adjustable movement to member 64. On certain types of ignition generators where it is desired to bring out the high tension lead the thrust member 64 may take the form of a contact brush as will be well understood.

The lower part of cover 60 carries a stub shaft 69, on one end of which is fastened a lever 70 being clamped thereto in any suitable manner as by set screw 71, by which construction it will be understood that the upper end of the lever 70 may be set in any desired position, to be engaged by the operating levers used for controlling the position of the spark; and since the lever 70 may be quickly adjusted to any position it is universal in its applicaton. To the inner end of the stub shaft 69 is connected a bell crank lever 72, the end of which 73 is adapted to engage a slot 74 in the breaker box 48 to rotate the same on the bearing surface 75 which co-operates with a suitable bearing surface on the plate 5. Movement of the breaker box 48 is limited by slot 76 engaging the stop pin (not shown) carried by plate 5.

The cover plate 60 is preferably held to the cover plate 5 by quick detachable means such as springs 82, so that when these springs are actuated the whole of the plate 60 may be removed and the entire distributer and circuit breaker revealed for inspection of operation, etc. The conductors leading to the distributer and circuit breaker are not disturbed and the machine can function within plain sight of the observer. In the usual form of ignition generator the distributer block itself must be removed in order to get at the distributer finger, and of course this at once puts the machine out of commission, while my construction is such that the entire block itself is covered up away from injurious agents but may be uncovered without disturbing its function, and since the track for the distributer brush is in plain sight when the cover plate 60 is removed, all parts with the possible exception of the condenser, are open for instant inspection.

While I have shown and described one embodiment of my invention, I do not wish to be limited to the exact details shown and described, as it is understood that these may be varied to a great extent without departing from the spirit of my invention and scope of my appended claims. Having thus described my invention what I claim, is, 1. An electric generator including a rotary inductor housed within a base structure having two sets of stationary pole pieces, one set having the pole pieces constituting the set arranged on opposite sides of a vertical plane passing through the axis of rotation of said inductor but cut by a horizontal plane passing through said axis near the center of their arcuate faces, said one set of pole pieces being inclined at an angle with reference to said vertical plane and also being shouldered for the reception of permanent magnets, and the other set arranged on the same side of said horizontal plane but longitudinally spaced apart, permanent magnets associated with and fitting the shoulders on the first set of pole-pieces and a current generating coil in fixed relationship to the last mentioned set of pole pieces and adapted to be acted upon by the magnetic flux through said pole pieces.

2. An electric generator including a rotary inductor housed within a base structure having two sets of stationary pole pieces, one set having the pole pieces constituting the set arranged on opposite sides of a vertical plane passing through the axis of rotation of said inductor said one set of pole pieces being laminated and positioned in the base structure at an angle and being shouldered to present horizontal and vertical portions to magnets, and the other set arranged on the same side of a horizontal plane passing through the axis of rotation of said inductor, said pole pieces having flat exterior surfaces, and being longitudinally spaced apart, magnets associated with and fitting the shoulders on the first set of pole pieces and a current generating coil having a core with enlarged polar area to engage said flat exterior surfaces and means for holding said coil in fixed relationship to said flat pole pieces.

3. An electric generator including a rotary inductor housed within a base structure having two sets of stationary pole pieces, one set having the pole pieces constituting the set shouldered and arranged on opposite sides of a vertical plane passing through the axis of rotation of said inductor but cut by a horizontal plane passing through said axis near the center of their arcuate faces and the other set arranged on the same side of said horizontal plane but longitudinally spaced apart, magnets associated with the first set of pole-pieces and fitting said shoulders and a current generating coil having a U-shaped core with enlarged polar areas held in fixed relationship with the last mentioned pole-pieces.

4. In an electric generator, a base structure carrying two sets of pole pieces, a rotary member supported by and within said base, one set of said pole pieces having the pole pieces constituting the set shouldered and arranged on opposite sides of a vertical plane passing through the axis of rotation of said rotary member and extending longitudinally of said base structure for the major portion of its length, and the other set arranged longitudinally on the same side of a horizontal plane passing through the said axis of rotation but spaced apart, a current generating coil having a core with polar projections held in fixed relationship to the last mentioned pole pieces, magnets associated with and fitting said shoulders of the first set of pole pieces, said rotary member having inductor members arranged in spaced relationship in pairs 180° apart on opposite ends thereof, one pair being angularly displaced 90° from the other pair whereby inductors 90° apart on opposite ends of the rotary member produce flux changes through said coil.

5. In an electric generator, a base structure carrying two sets of pole pieces, a rotary member housed within said base structure, one set of said pole pieces having its pole pieces shouldered and arranged on opposite sides of a vertical plane passing through the axis of rotation of said rotary member but a considerable distance from the bottom of the base and extending lengthwise of the base structure for the greater part of its length and the other set arranged longitudinally in line equidistant from the pole pieces of the first set but spaced apart from each other, a current generating coil having a U shaped core with enlarged polar areas in fixed relationship to the last mentioned pole pieces, magnets associated with and fitting said shoulders of the first pair of pole pieces, said rotary member having inductors arranged thereon so that a plurality of flux changes may be produced through said coil for each revolution of the rotary member.

6. In an electric generator, a base structure carrying two sets of fixed pole pieces, one set of pole pieces being arranged in spaced relationship in tandem in the top of the base structure and the other set of pole pieces being arranged on opposite sides of the base structure approximately 90° from the first set of pole pieces and away from the bottom of the base, a current generating coil having a core with enlarged polar areas held in fixed relationship to the first set of pole pieces, magnets carried by said base structure in engagement with the second set of pole pieces, and a rotary member carrying inductors for producing flux changes through said coil carried and supported by said base structure.

7. In an electric generator, a base structure carrying two sets of fixed pole pieces, one set of pole pieces being arranged in spaced relationship in tandem in the top of the base structure and the other set of pole pieces being arranged on opposite sides of the base structure approximately 90° from the first set of pole pieces and away from the bottom of the base, a current generating coil having a core with enlarged polar areas held in fixed relationship to the first set of pole pieces, permanent magnets carried by said base structure so as to be engaged by the second set of pole pieces on their ends and inner faces and a rotary member carrying two sets of 180° spaced indicators in opposite ends thereof, each set being angularly displaced 90° with reference to the other set as and for the purpose described.

8. A magneto electric generator including a rotary member having a drive shaft with non-magnetic material anchored thereto and inductors securely fastened to the outer portions of the non-magnetic material, said inductors being arranged 180° apart in spaced pairs on opposite ends of the rotary member, one pair being angularly displaced 90° with reference to the other pair; a housing for said rotary member, said housing carrying at the top a pair of fixed flat pole pieces arranged in tandem but spaced apart and a second pair of pole pieces extending the major portion of the length of the housing, one on either side of the housing angularly equidistant from the first pair of pole pieces, but a considerable distance from the bottom of the housing, magnets engaging said second pair of pole pieces and a current generating coil having a core with enlarged ends to engage said flat pole pieces as described.

9. A magneto electric generator including a rotary member having inductors carried thereon in spaced relationship, a housing for carrying said rotary member, a field magnet having a set of pole pieces carried by the housing and extending the major portion of the length of said housing for energizing said inductors, a set of elongated flat top pole pieces carried by the housing and arranged in tandem equidistant from the first set of pole pieces and a current generating coil having a U shaped core with its polar ends held in fixed relationship with said flat top pole pieces.

10. In a magneto electric generator, a base structure forming a housing, a pair of pole pieces set in opposite sides of said housing forming shoulders therein, a magnet supported on said shouldered pole pieces, a second pair of pole pieces set in tandem in the top of the housing equidistant from the first pair of pole pieces and having flat surfaces extending above the housing, a generating coil having a U shaped core with its pole ends fixed to said flat surfaces and rotary inductor carried within the housing for shifting the flux from said magnet through said coil.

11. In a magneto electric generator, a base structure forming a housing, a pair of pole pieces fixed in tandem in the top of the housing, and forming a part thereof, a coil structure carried on said pole pieces, a second pair of pole pieces set one on either side of the housing, and forming a part thereof, a magnet bridging said second pair of pole pieces, end plates attached to the opposite ends of said housing, a rotary member within the housing, having bearings in said end plates and carrying inductors for shifting the flux from said second pair of pole pieces through said first pair and the coil structure.

12. A magneto electric generator in which the generator coil is stationary and in which flux changes are produced through the core of said coil by a rotatable member supported on bearings between end plates and which carries inductors, co-acting between magnet pole pieces and pole pieces associated with said coil, further characterized in that, one of the end plates has a supplemental plate screw fastened thereto, said screw being hollow and serving as an oil duct to the bearing in said end plate, said supplemental plate engaging the magnet to close the opening within the arch thereof as described.

13. In a magneto electric generator two sets of pole pieces, magnets associated with one set and a current generating coil having a core associated with the other set, a rotary member carrying inductors for distributing the magnetic flux from the magnet pole pieces to the coil pole pieces, said coil having heads of magnetic material for bridging its core for preventing flux leakage as described.

14. In a magneto electric generator two sets of pole pieces, magnets associated with one set and a current generating coil having a core associated with the other set, a rotary member carrying inductors for distributing the magnetic flux from the magnet pole pieces to the coil pole pieces, heads for said coil consisting of an outer member of magnetic material serving as a flux gatherer and an inner member of insulating material fastened thereto to insulate the coil winding from the outer member as described.

15. In a magneto electric generator, two sets of pole pieces, one set having magnets associated therewith and the other set having relatively long flat surfaces, a current generating coil having a U shaped core, the arms of which terminate in enlarged polar areas to contact with the said pole pieces having flat surfaces, a rotary member carrying inductors for distributing the magnetic flux from the magnet pole pieces to said coil pole pieces, said coil having U shaped flux gathering heads with insulating members attached thereto and presented toward said coil, said heads extending parallel with the arms of the coil core and embracing the said enlarged polar areas as described.

16. In a magneto electric generator, two sets of pole pieces, one set having magnets associated therewith and the other set having relatively long flat surfaces, a current generating coil having a U shaped core, the arms of which terminate in enlarged polar areas to contact with the said pole pieces having flat surfaces, a rotary member carrying inductors for distributing the magnetic flux from the magnet pole pieces to said coil pole pieces, said coil having U shaped heads, the arms thereof extending substantially parallel with the arms of the coil core and embracing one end of the said enlarged polar areas as and for the purpose described.

17. In a magneto electric generator, two sets of pole pieces, one set having magnets associated therewith and the other set having relatively long flat surfaces, a current generating coil having a U shaped core, the arms of which terminate in enlarged polar areas to contact with the said pole pieces having flat surfaces, a rotary member carrying inductors for distributing the magnetic flux from the magnet pole pieces to said coil pole pieces, said coil having U shaped flux gathering heads with insulating members presented toward said coil moulded to said heads in such a manner that rivets are formed of the insulating material, a part of said rivets being used as bushings for conductors leading from said coil windings, said heads extending over and embracing said polar areas as and for the purpose described.

In testimony whereof I affix my signature.

EDWARD B. NOWOSIELSKI.